Dec. 31, 1968  C. F. PAVLIN ET AL  3,419,738

HETEROGENOUS FLOW GENERATING DEVICE

Filed Oct. 18, 1965  Sheet 1 of 2

Inventors
Cyrille Francois Pavlin
Benjamin Jean Marcel Salmon

Stevens, Davis, Miller & Mosher
Attorneys

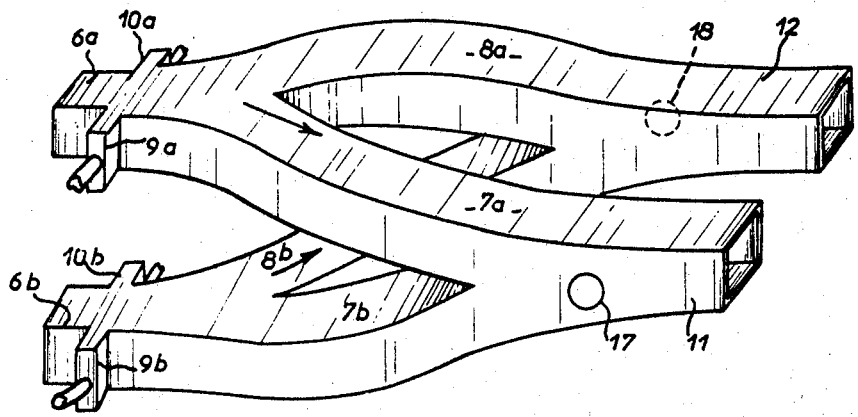
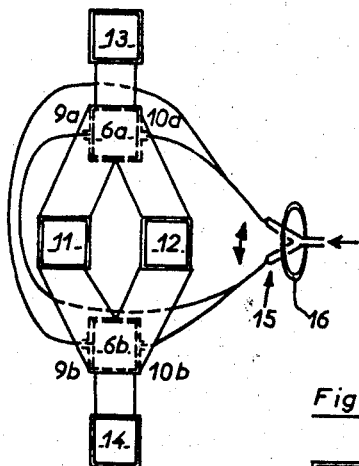
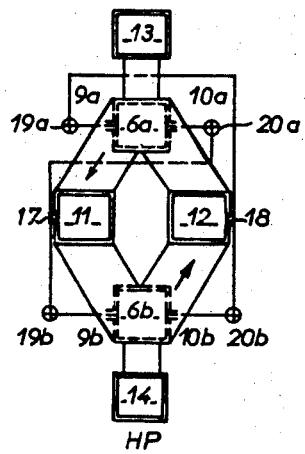
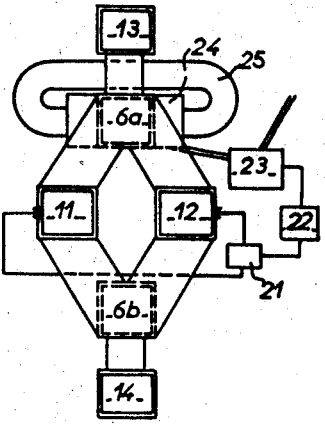

United States Patent Office 3,419,738
Patented Dec. 31, 1968

3,419,738
HETEROGENOUS FLOW GENERATING DEVICE
Cyrille François Pavlin, Saclay, and Benjamin Jean Marcel Salmon, Suresnes, France, assignors to Bertin & Cie, Paris, France, a French company
Filed Oct. 18, 1965, Ser. No. 497,076
Claims priority, application France, Nov. 18, 1964, 995,424
8 Claims. (Cl. 310—11)

ABSTRACT OF THE DISCLOSURE

Magnetohydrodynamic generator plant designed to be traversed by a heterogeneous flow delivered by a device comprising two separate input pipes respectively and permanently fed with two fluids of different characteristics, and leading respectively to two fluid-actuating triggers from each of which two output pipes branch, one output pipe of one trigger merging with one output pipe of the other trigger into a junction pipe and the other two output pipes of said triggers merging likewise into a further junction pipe, said triggers being under the control of means actuating them in association though in phase opposition, whereby said different fluids are chopped up by the respective triggers into slices which are directed alternately into the corresponding output pipes and the slices of one fluid are inserted between the slices of the other fluid in the corresponding junction pipes.

---

The heat energy of a high-temperature gas flow can of course be directly converted into electric power; to this end, the gas is made conductive by the addition of at least one alkaline metal in the ionised vapour state, then goes through a duct disposed between the pole pieces of a magnet which is in practice a powerful electromagnet. Interaction between the high-temperature flow of conductive gas and the magnetic field produces a usable potential difference at appropriately placed electrodes in the duct walls.

The main problems in devising a magnetohydrodynamic generator which can operate continuously for a prolonged time concern the ability of materials to withstand very severe working conditions; this kind of generator operates at a temperature above 1200° C. and the high-speed gas flow contains substances which are chemically very active, and so the duct walls, particularly the electrodes, are likely to be eroded and corroded rapidly.

An object of the invention is to facilitate generator construction by using a gas flow having a relatively low mean temperature because it comprises consecutive portions which are relatively cool and relatively hot, at least some of the portions being conductive. Of course this result must be achieved without recourse to moving members in contact with the gas flow. On the basis of thermal considerations, which govern the behaviour of materials, and because of the heat inertia thereof, a gas flow consisting of consecutive portions of a first hot gas which has been ionised, for instance, by seeding with an alkaline metal, and a second unionised and relatively cool gas is equivalent to a homogeneous gas having a temperature somewhere between the temperatures of the hot and cold portions. However, since the electrical conductivity of a gas rises exponentially in dependence upon its temperature, the portioned gas flow is more conductive than a thermally equivalent homogeneous flow. This is an extra advantage for magnetohydrodynamic generators and one to which the invention specially relates.

Another object of the invention is to enable an A.C. voltage to be taken directly from electrodes flowed past by a gas flow.

A wider aim of the invention is to provide a gas flow formed by consecutive portions of various fluids. This has to be understood as meaning that such fluids vary in at least one particular physical characteristic, such as their temperature, pressure, dissociation and ionisation levels, or composition in the case of mixtures, and possibly in characteristics which may be due to a difference in the nature of such gases—e.g., density, refractive index and chemical activity and so on.

These objects and others are achieved in accordance with the invention by the use of two juxtaposed hydrodynamic or aerodynamic gates whose like discharge passages are combined, these basic or elementary gates each receiving a continuous supply of one of the fluids required to flow in consecutive portions, each elementary gate being associated with control means enabling the two basic gates of a pair to operate in phase opposition. The gates can be either of symmetrical construction—as in the embodiments shown—or of asymmetrical construction.

To provide an A.C. magnetohydrodynamic generator, electrodes and pole pieces which can be electrically and magnetically interconnected in any appropriate manner are placed around each common discharge passage of the two elementary gates. One way in which the electrodes can be connected up will be described hereinafter by way of example, but details concerning this electromagnetic part of a generator lie in general outside this invention, as does also the apparatus for supplying the gates with a hot and conductive gas and with a cool gas.

In a first embodiment of the invention, two juxtaposed gates, hereinafter called "main gates" are controlled by a pilot gate or vibrator, each of whose discharge passages split into two basic or elementary passages connected to oppositely disposed control nozzles in each of the two main gates. A system of this kind is of use inter alia with fluids whose pressures are at least subtantially equal.

As a variant, two main gates respectively supplied with fluids at different pressures from one another can be associated with an automatic control system comprising a pressure tap in one wall of each of their common discharge passages below the junction of two like exits, each pressure tap being connected by a Y control passage to two control nozzles respectively forming part of the two main gates, the nozzle of the high-pressure gate being disposed on the same side as the associated pressure tap, the nozzle of the low-pressure gate being disposed on the opposite side.

A gate supplied with a conductive gas can be controlled by at least one electromagnet whose magnetic field is so orientated as to be able to act on the flow of conductive gas. Any conventional electrical means can then be used to combine control of a main gate supplied with ionised gas with control of the associated gate supplied with cool gas, the piloting of the latter gate being immaterial.

For a better understanding of the invention and to show how the same may be carried into effect, reference may now be made to the accompanying drawings wherein:

FIG. 5 is a perspective view of a double gate forming the main hydrodynamic or aerodynamic part of the system according to this invention;

FIG. 6 is a diagrammatic view of a pneumatically controlled double gate enabling portions of two gas flows at similar pressures to follow one another;

FIG. 7 is a diagrammatic view of a magnetohydrodynamic system with a direct A.C. output in accordance with the invention, the system having an automatic pneumatic control system for the supply of two gases at different pressures;

FIG. 8 is a diagrammatic view of a double gate whose basic conductive-gas gate is controlled electromagnetically.

Figure 1:
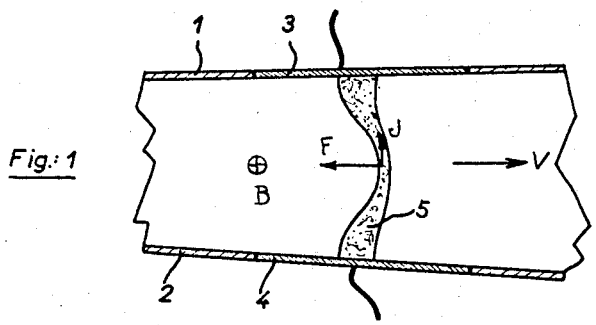
FIG. 1 is a diagrammatic view of a conductive slice or portion of a gas flowing through a magnetohydrodynamic pipe.

FIG. 1 shows in diagrammatic form a nozzle adapted for magnetohydrodynamic conversion of the heat energy of a high-temperature gas flow V into electric power, the nozzle accordingly having side walls 1, 2 in which conductive electrodes 3, 4 and pole pieces of a powerful electromagnet are embedded, the pole pieces being disposed respectively above and below the plane of FIG. 1 to produce a magnetic field B perpendicular to such plane.

A conductive portion 5 of the gas flow is shown going through the nozzle; the gas forming this portion can in known manner be made electrically conductive by the addition of a small quantity of an alkaline metal in the vapour phase. Alternate portions of hot and at least relatively cold gases pass by the electrodes 3, 4, the "slotting" of the gases being effected by means which will be described hereinafter; thermally, because of the thermal inertia of the materials used for the nozzle, the portions together correspond to a homogeneous gas at an intermediate temperature. Of course, the hot and cold gases are chosen to be within the strength limits of the least strong material used to form the nozzle. A gas flow consisting of alternate portions is a better electrical conductor than this imaginary homogeneous gas since the electrical conductivity of ionised gases varies exponentially with temperature.

In a flow consisting of alternate portions, temperature differences originally present between the gas flows from which any two consecutive portions are derived may be amplified, possibly from a zero temperature difference, since for a portion of low-pressure fluid sandwiched between two portions of higher-pressure fluid is compressed substantially adiabatically until all the pressures balance once the oscillations are damped. If diffusion phenomena tending to mix the two gases are neglected, the portion which is initially at a low pressure is, therefore, heated, possibly to a considerable extent if the overpressure of the higher-pressure fluid is great enough. More particularly, if the low-pressure and high-pressure fluids both have the same temperature to start with, the initially low-pressure portions finally become hotter than the initially high-pressure portions. Consequently, the temperature and ionisation of a "portioned" conductive gas can be increased, with a corresponding increase in the power which any particular magnetohydrodynamic nozzle can extract from the gas.

Also, the non-conductive portions are useful; a conductive portion which produces a useful current and whose movement past the electrodes is retarded by an electromagnetic force F induced by a magnetic field is simultaneously pushed by the immediately following non-conductive portion, the pressure of which tends to increase momentarily, and pulled by the immediately preceding non-conductive portion whose pressure simultaneously decreases.

In a nozzle of this kind in which the flow is retarded by an electromagnetic force F, thin portions of conductive gas seem preferable to thick portions. In a flow consisting of alternate thick conductive and non-conductive portions, the non-conductive portions can only be slowed by the conductive portions, with a consequent risk of Rayleigh-Taylor instabilities, the non-conductive gas tending to pass through a portion of conductive gas. On the other hand, in a thin conductive portion, one of the occasionally thinned portions becomes the seat of an increased current density, so that nevertheless such seat spreads throughout the complete ionised portion. Consequently, the thinned zone of the conductive portion experiences a locally increased retarding force. This stabilising force can be compared with the restoring force which tends to reduce deformations of a stretched resilient membrane or the like.

Another advantage arising from the use of gas flows consisting of conductive portions alternating with insulating portions is that the insulating portions oppose the flow of Hall currents tending to be superimposed directionwise and signwise upon the gas flow.

Figure 2:
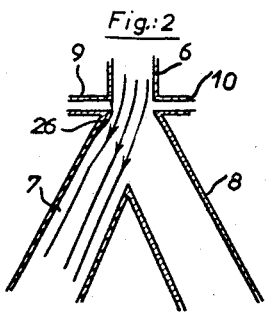
FIG. 2 is a diagrammatic plan view of a hydrodynamic or aerodynamic gate.
Figure 3:
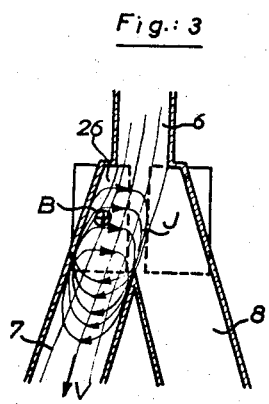
FIGS. 3 and 4 are diagrammatic views of two ways in which the pole pieces of electromagnets can be arranged to control a conductive-gas gate.
Figure 4:
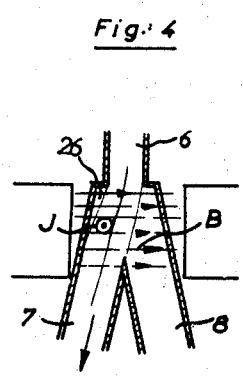

FIGS. 2-4 show elementary or basic aerodynamic or hydrodynamic gates of use for the purposes of the invention. The gates comprise a supply passage 6 which splits to form two discharge passages 7, 8. Two control nozzles 9, 10 can, as shown in FIG. 2, be disposed near the junction of the side walls of the supply passage 6 with the side walls of the discharge passages 7, 8. A negative or positive pressure difference between either nozzle and the supply passage 6 leads of course to the entire flow through the gate being deflected towards one of the discharge passages 7 or 8. In the particular case shown in FIG. 2, the flow is passing through the left-hand discharge passage 7; this state of affairs can be reached either by a positive pressure in the nozzle 10 or by a negative pressure in the nozzle 9. The reason for this is that normally a gas vortex pocket exists near the edge of the dihedron formed by the walls of the passages 6 and 7 or 8 downstream of such edge. If the pressure in such a pocket 26 is reduced, for instance, by a negative pressure in the nozzle or control passage 9, the input flow sticks to the corresponding wall—the wall of the passage 7 in the particular example shown. On the other hand, a positive pressure applied via either passage 9 or 10 inflates the corresponding vortex pocket and deflects the stream towards the discharge passage on the opposite side, with no action on the main flow by addition of momentums.

Referring now to FIGS. 3 and 4, when the gas deflected to one of the discharge passages 7 or 8 is conductive, pole pieces of electromagnets can be used instead of the control nozzles 9, 10 to provide an inductive control of the ionised fluid. In FIG. 3 the pole pieces are disposed below and above the plane of the drawing at the junction of the discharge passages, one pair of pole pieces being disposed in association with each such passage. Each pair of pole pieces provides when energised a control magnetic field B perpendicular to the plane of FIG. 3. This field produces eddy currents J in the ionised gas which tend to retard the flow so that the gas flow swings over towards the non-energised pole pieces—i.e., to the right and towards the passage 8 in FIG. 3. Energisation of the electromagnets can cease after each swing-over step since the flow is stable in either of its deflected positions.

Referring to FIG. 4, only two pole pieces are provided and are arranged to produce a magnetic field B parallel to the plane of FIG. 4 and perpendicular to the direction of flow of the fluid through the passage 6. On the assumption that, for instance, the fluid flow entering via the passage 6 leaves initially through the passage 7, energisation of the electromagnet produces eddy currents J in the flow of conductive fluid, and the eddy currents slow down the flow entering the discharge passage 7 briefly but enough for the flow to swing over to the other and free discharge passage 8. Of course the time for which the electromagnet stays energised must be brief if eddy currents are to be avoided in the fluid flowing through the passage 8 after the changeover. If the electromagnet were to be energised continuously, the flow of current fluid would spontaneously "flip-flop" whenever it started to flow fast enough toward either passage 7 or 8. In this case, the system behaves like a multivibrator.

Referring now to FIG. 5, there can be seen in perspective a double gate which forms the main aerodynamic or hydrodynamic part of the system according to the invention and which forms a simple way of providing fluid flows consisting of consecutive portions of two different fluids.

The double gate is formed by two juxtaposed single gates; the supply passages 6a, 6b thereof are connected one each to two pressure fluid generators, and the discharge passages 7a, 7b in one case and 8a, 8b in the other case, join to form two discharge passages 11, 12. The double gate can have any appropriate control means, preferably chosen from those described with reference to FIGS. 2 to 4.

FIG. 6 is a view in diagrammatic form of a system providing two flows each consisting of consecutive portions of two fluids of at least substantially the same pressure. It is assumed that the view is an end view on to the discharge end of the double gate. Two supply fluids are pressurised by generators 13, 14 such as pumps or compressors. In order that the fluid delivered by the generator 13 may be directed towards the discharge 11 simultaneously as the fluid from the generator 14 is directed towards the discharge 12, a pilot gate 15 controls the control nozzles 9, 10 of the main gates 6a, 7a, 8a and 6b, 7b and 8b. The pilot gate can be, for instance, an oscillator embodied by an appropriate connection through a passage 16 of the two control nozzles of a gate whose discharge passages are connected the one to the nozzles 9a and 10b and the other to the nozzles 9b and 10a. When a feed is supplied to the pilot gate 15 and the passages 6a, 6b, each discharge passage 11, 12 of the double gate delivers a fluid flow consisting of consecutive and alternate portions of each of the two fluids compressed by the generators 13, 14. The connection just described in respect of the discharge passages of the pilot gate and of the control nozzles of the double gate leads to two portions of different fluids discharging simultaneously through the discharge passages 11, 12, with no disturbance of the supply flows. The relative deliveries of the generators 13, 14 control the relative thickness of the flow portions leaving the passages 11, 12. The changeover frequency controlled by the pilot gate 15 controls the absolute thickness of such portions. The bottom limit for thickness is determined more particularly by the risk of the fluids mixing by diffusion.

FIG. 7 is a diagrammatic view similar to FIG. 6 of an advantageous variant well-suited to the direct generation of A.C. by magnetohydrodynamic conversion. The double gate is identical to the one just described with references to FIGS. 5 and 6, but the generators 13, 14 supplying the gates 6a, 6b operate at different pressures from one another. In this case the pilot gate 15 can be omitted provided that the control nozzles 9a, 9b are connected in some appropriated fashion to two pressure taps 17, 18 disposed in the discharge passages 11, 12 respectively. It will be assumed that the generator 13 delivers a gas at a relatively low pressure, for instance, a hot gas which has been made conductive by being seeded with an alkaline metal in the vapour state, while the generator 14 delivers a gas at a higher pressure but lower temperature. Each pressure tap 17, 18 is connected to the supply passage 6b, supplied with the higher-pressure medium through a control disposed on the same side as the respective pressure intake, and to a supply passage, to which the lower pressure is supplied through a control nozzle on the opposite side.

The operation of a system of this kind can be described from an almost static outlook as follows:

First, the consecutive gas portions moving past the pressure taps 17, 18 at a predetermined periodicity are at pressures somewhere between the pressures of the continuous gas flows delivered by the generators 13, 14. Consequently, the pressure which is operative in the control passages and which is transmitted to the nozzles 9a, 10a corresponds at most to the minimum of the pressures at the taps 17, 18, whereas the pressure at the level of the nozzles 9b, 10b corresponds at least to the maximum of the pressures at the taps 17, 18. Since the purpose of each nozzle is to interrupt one asymmetric flow of the double gate and replace it by the other possible asymmetric flow, the nozzles 9b, 10b, which must operate by vacuum, must, as previously stated, be respectively connected to the pressure tap 17, 18 disposed on the same side as each of them. On the other hand, the nozzles 9a, 10a which act by overpressure must be respectively connected to the pressure tap disposed on the side opposite to each of them.

The periodic operation giving delivery of a flow consisting of consecutive portions through each of the discharge passages 11, 12 always starts from an initial stage of asymmetric operation in which one of the supply flows goes to one of the discharge passages and the other flow goes to the other discharge passage. If at starting both flows were to go spontaneously to a single discharge passage, e.g. the passage 11, the high-pressure stream would rapidly change over to the other passage, for there would be a temporary blockage of the low-pressure fluid by the high-pressure fluid and during such blockage the discharge passage 12 and the pressure tap 18 associated therewith would temporarily be at atmospheric pressure. The pressure tap 17 would be simultaneously be at the presence of the high-pressure generator 14. Consequently, the suction effect at 10b of atmospheric pressure would make the high-pressure flow changeover to the passage 12, whereas the suction nozzle 9a and blowing nozzle 10a would keep the high-pressure flow in its initial position. Alternatively, it can be assumed that the low-pressure fluid blockage produced by the high-pressure fluid would suffice to deflect the low-pressure fluid towards the unoccupied discharge passage, which is another way of reaching an asymmetric initial flow.

After this initial operating condition of the double gate, the combination of the pressure tap and control nozzles forces a change over to the other possible asymmetric flow, to determine the thickness of the first two portions of the hot gas and cold gas, such portions being of course followed by other portions so that the system commences periodic operation. Since the pressures produced by the generators 13, 14 differ from one another, there is no reason for the low-pressure portions to be the same thickness as the high-pressure portions. Preferably, therefore, the control passages (connecting the pressure taps 17, 18 to the nozzles 9a, 10a and 9b, 10b) have valves 19a, 20a and 19b, 20b ensuring that the control signals reach all the nozzles simultaneously. Valves as 19a, 20a, associated with a single supply passage, as 6a, can have a common control. The valves also help to control the changeover frequency of the system, such frequency depending only upon the rate of pressure signal transmission.

In practice, dynamic considerations modify operation as just outlined, since wave fronts moving in the control passages cause phase shifts which must be allowed for in the adjustment of the valves 19a, 20a and possibly also in the way in such passages are connected.

As already stated, the oscillation frequency of the double gate, and the relative deliveries of the generators 13, 14, are adjusted so that the length of an ionised gas portion is at most equal to the length of a basic or elementary electrode, whether the same is associated with others, as for polyphase current, or is single, as for single-phase current. The length of an insulating portion of gas is at least equal to the length of the conductive portion, and the added-together lengths of an insulating portion and of a conductive portion are a multiple of the length of a basic electrode.

A high enough resistance on the part of the system to the gas flow delivered by the generator 14 may cause such flow to spontaneously oscillate between the two discharge passages 11 and 12, but if the response time of the control system is short enough, the same can maintain the phase-opposition relationship between the two gates and, if need be, increase the operating frequency of the system.

FIG. 8 shows a variant of this feature using periodic spontaneous operation of this kind in the case of the high-pressure gate, the low-pressure gate being controlled electromagnetically. The pressures in the discharge passage 11, 12 act on at least one detector 21 of any known kind delivering an electrical output signal which is amplified by an amplifier 22 and, if need be, phase-shifted in a phase shifter 23, then applied to a winding 24 of an electromagnet 25 acting magnetically, in the manner described with reference to FIGS. 3 and 4, on the gas flow from the generator 13 to the gates 6a, 7a, 8a. The discharge passages 11, 12 form magnetohydrodynamic conversion nozzles; since they are supplied with alternate conductive and non-conductive portions of gas flow, they deliver A.C. directly.

Figure 9:
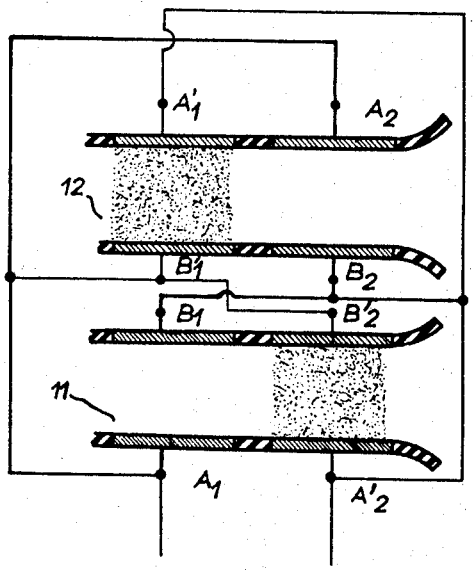
FIG. 9 shows one possible way of connecting up electrodes respectively associated with the discharge passages of the double gate shown in FIG. 5.

FIG. 9 shows one way of connecting up multiple electrodes which can, with advantage, be provided in such conversion nozzles. As an example, each discharge passage 11, 12 has two pairs of electrodes having respective output terminals $A_1$, $B_1$; $A'_1$, $B'_1$, and $A'_2$, $B'_2$; $A_2$, $B_2$. On the assumption that the direction of ionised fluid flow in the two passages 11, 12 is the same and that terminals denoted by the same letter are of like polarity when an electric current flows through them, it will be apparent from the relative arrangement of the terminals A and B associated with each passage 11 and 12 that the magnetic fields perpendicular to the plane of the drawing are oppositely directed in each such passage. The relative arrangement of the terminals A, A'; B, B', whatever the index may be, corresponds to the fact that, if it is certain that two portions of ionised gas cannot be disposed simultaneously between the electrodes $A_1$, $B_1$; $A'_1$, $B'_1$, the longitudinal distance between the electrodes A, A'; B, B' can be assumed to be such that two ionised fluid portions are simultaneously present between the electrodes $A'_1$, $B'_1$ and $A'_2$, $B'_2$, in the light of the rate of fluid flow. Consequently, if the terminal $A_1$ are interconnected, the terminals $B'_1$ and $B'_2$ are interconnected, the terminals $B_1$, $B_2$ are interconnected and the terminals $A'_1$ and $A'_2$ are interconnected, A.C. is available, for instance, between $A_1$ and $A'_2$.

Assuming, for instance, that a portion of ionised fluid is simultaneously present at the electrode pairs $A'_1$, $B'_1$ and $A'_2$, $B'_2$, and on the basis of the hypothesis stated earlier that the magnetic filds associated with the passages 11 and 12 are oppositely directed, it will be apparent that an electric current can flow from $A_1$ to $A'_2$ or—which comes to the same thing—from $B'_1$ to $A'_2$, the flow being from $B'_1$ to $A'_1$ and $A'_2$ or from $B'_1$ to $B'_2$ and $A'_2$. During this half-alternation there can be no flow of electricity from $A_1$ to $B_1$ or from $A_2$ to $B_2$ since these electrodes are separated by electrically insulating portions of fluid. During the next half-alternation, conductive portions of fluid will be disposed respectively between the electrode pairs $A_1$, $B_1$ and $A_2$, $B_2$ while the other electrodes are separated by electrically insulating portions, current then flowing from $A'_2$ to $A_1$.

When the conductive portions are in any position relatively to the electrodes, there is always a superimpositioning of oppositely directed currents produced respectively by the electrodes A, B and A', B', whatever the index of the electrodes may be. The respective strength of these currents is in a first approximation proportional to the volume of conductive gas present between each pair of electrodes concerned; consequently, the total signal would be a symmetrical sawtooth curve if the speed and the electrical conductivity of the fluid flow were everywhere the same, if the separation between consecutive conductive and non-conductive portions was sharply defined and if the length of a conductive portion was the same as the length of the electrodes. If the conductive portions are shorter than the electrodes, the resulting signal, other conditions being the same, would be trapezoidal. Actually, because of the general deceleration of the fluid flow by Laplace forces, diffusion phenomena and exchanges at the boundary surface between consecutive portions, the sawteeth are blunted and the current actually attained tends to approximate to a sinusoidal shape.

When a conductive portion exactly straddles two electrodes, the voltages produce, for instance, at the terminals $A_1$, $B_1$; $A'_2$, $B'_2$ cancel one another out exactly. The effect of the magnetic field on the ionised portion pass in front of each of the pairs of electrodes is to produce an electric current flowing in closed circuit in the ionised gases. The Joule effect associated with the latter electric current may be very advantageous if it leads to considerable electronic heating which can ionise the gas beyond thermal equilibrium, in which event, because of the time required for recombination the ionised fluid is given increased electrical conductivity one quarter-period later, at the time when the electric current flowing in the external or load circuit is at its maximum.

If the conductive portions are of reduced thickness in comparison to the transverse dimensions of the flow stream, a system as described provides a useful reduction in parasitic Hall currents. This is a valuable feature, particularly when it is required to produce D.C., in which case unsegmented electrodes can be used.

The invention is not of course limited to the embodiments described herein in detail and covers embodiments obtainable by using equivalent technical means. More particularly, and in accordance with an operation hereinbefore described, a gate 6a, 7a, 8a devised to have low stability can be combined with a self-oscillating gate 6b, 7b, 8b; in such a case, the alternate blocking of the discharge passages 11, 12 by the high-pressure gas portions is sufficient to keep the gate 6a, 7a, 8a in phase opposition. In cases where the mean temperature of the gas stream stays low, gates or, more generally, valves of any known kind can be used, comprising moving physical elements controlled in some appropriate fashion. Also, at least two gates, such as the double gates hereinbefore described, can be disposed in serial relationship, for instance, in order that non-conductive portions may interrupt a conductive portion of considerable length (and of course the two non-conductive portions on either side thereof, without any special effect). The invention is of equal use for gaseous fluids and for liquids.

What we claim is:

1. A device for generating flows formed of successive slices of two different fluids, comprising two associated fluid-dynamically operating triggers, an input pipe connected with one of said triggers and adapted to supply permanently thereto one of said fluids, an input pipe connected with the other trigger and adapted to supply permanently thereto the other of said fluids, two output pipes connected with each of said triggers and adapted to lead therefrom the respective fluids, a junction pipe into which one output pipe of one trigger joins with one output pipe of the other trigger, a further junction pipe into which the other output pipe of one trigger joins with the other output pipe of the other trigger, and trigger control means for actuating said triggers in phase opposition, whereby said different fluids are chopped up by the respective triggers into slices which are directed alternately into the corresponding output pipes and the slices of one fluid are inserted between the slices of the other fluid in the corresponding junction pipes.

2. Device as claimed in claim 1, wherein each of said triggers comprises two oppositely-facing control nozzles positioned at the downstream end of the respective input pipe on the same sides thereof as the upstream ends of the respective output pipes, and wherein said trigger control means comprises means for alternately operating said control nozzles, whereby the corresponding permanently supplied fluid is directed alternately into one and the other of said respective output pipes.

3. Device as claimed in claim 2, wherein said trigger control means comprise a fluid-dynamically operating, oscillator type, pilot-trigger and output ducts extending between said pilot-trigger and said control nozzles.

4. Device as claimed in claim 2, wherein said fluids are at substantially different pressures, and wherein said trigger control means comprises a pressure tap on each of the joining output pipes of said triggers, a connection duct between said tap and the control nozzle of the trigger fed at the higher of said pressure, which is positioned on the same side, and a connection duct between said tap and the opposite control nozzle of the other trigger.

5. Device as claimed in claim 1, wherein one fluid is electrically conductive, and the corresponding trigger control means comprises electromagnets.

6. Device as claimed in claim 5, wherein at least one electromagnet comprises pole-pieces adapted to produce a magnetic field perpendicular to the plane defined by the flow directions through the input pipe and the two output pipes of one of said triggers.

7. Device as claimed in claim 5, wherein at least one electromagnet comprises pole-pieces adapted to produce a magnetic field perpendicular to the flow direction through the input pipe and parallel to the plane defined by the flow directions through the two output pipes of one of said triggers.

8. A magnetohydrodynamic generator plant comprising two associated fluid-dynamically operating triggers, an input pipe connected with one of said triggers and adapted to supply permanently thereto one of two different fluids, an input pipe connected with the other trigger and adapted to supply permanently thereto the other of said fluids, two output pipes connected with each of said triggers and adapted to lead therefrom the respective fluids, a magnetohydronamically operating junction pipe into which one output pipe of one trigger joins with one output pipe of the other trigger, a further magnetohydrodynamically operating junction pipe into which the other output pipe of one trigger joins with the other output pipe of the other trigger, and trigger control means for actuating said triggers in phase opposition, whereby said different fluids are chopped up by the respective triggers into slices which are directed alternately into the corresponding output pipes and the slices of one fluid are inserted between the slices of the other fluid in the corresponding junction pipes.

References Cited
UNITED STATES PATENTS

| | | | |
|---|---|---|---|
| 3,071,154 | 1/1963 | Cargill et al. | 137—81.5 |
| 3,257,571 | 6/1966 | Jones | 310—11 |
| 3,327,223 | 6/1967 | Halista | 310—11 |
| 3,348,562 | 10/1967 | Ogren | 137—81.5 |

DAVID X. SLINEY, *Primary Examiner.*